United States Patent
Manuel-Devadoss

(10) Patent No.: US 10,341,129 B2
(45) Date of Patent: Jul. 2, 2019

(54) METHOD AND SYSTEM TO PROVIDE THE TRENDING NEWS STORIES TO THE PLURALITY OF GROUPS BASED ON THE PLURALITY OF GROUP MEMBERS EXISTING CONVERSATIONS

(71) Applicant: Johnson Manuel-Devadoss, Pearland, TX (US)

(72) Inventor: Johnson Manuel-Devadoss, Pearland, TX (US)

(73) Assignee: Johnson Manuel-Devadoss, Houston, TX (US)

( * ) Notice: Subject to any disclaimer, the term of this patent is extended or adjusted under 35 U.S.C. 154(b) by 44 days.

(21) Appl. No.: 15/681,379

(22) Filed: Aug. 19, 2017

(65) Prior Publication Data

US 2019/0058608 A1   Feb. 21, 2019

(51) Int. Cl.
 *H04L 12/18*   (2006.01)
 *H04L 12/58*   (2006.01)

(52) U.S. Cl.
CPC ........ *H04L 12/1859* (2013.01); *H04L 12/185* (2013.01); *H04L 51/12* (2013.01); *H04L 51/16* (2013.01); *H04L 51/32* (2013.01)

(58) Field of Classification Search
CPC ... H04L 12/1859; H04L 12/185; H04L 51/12; H04L 51/16; H04L 51/32
See application file for complete search history.

(56) References Cited

U.S. PATENT DOCUMENTS

| | | | |
|---|---|---|---|
| 8,713,022 B2* | 4/2014 | Jin .................. | G06Q 50/01 707/740 |
| 8,880,546 B1* | 11/2014 | Trauth .............. | G06F 16/9535 707/765 |
| 9,116,984 B2* | 8/2015 | Caldwell .......... | G06F 16/345 |
| 2007/0037513 A1* | 2/2007 | Bellamy ........... | H04L 12/185 455/3.04 |
| 2008/0168134 A1* | 7/2008 | Goodman .......... | H04L 51/12 709/204 |
| 2011/0218946 A1* | 9/2011 | Stern ................. | H04L 12/1859 706/12 |
| 2013/0007137 A1* | 1/2013 | Azzam ............... | H04L 51/16 709/206 |
| 2015/0370798 A1* | 12/2015 | Ju ..................... | G06F 16/9535 707/748 |
| 2016/0344718 A1* | 11/2016 | Pashman ............ | H04W 4/021 |
| 2018/0241701 A1* | 8/2018 | Miyajima .......... | G06Q 50/10 |
| 2019/0058608 A1* | 2/2019 | Manuel-Devadoss .............. H04L 12/1859 |

\* cited by examiner

*Primary Examiner* — Jerry B Dennison

(57) ABSTRACT

Disclosed is a method and system to provide the trending news stories to the plurality of groups based on the plurality of group members' existing conversations. Group admin registers the group by adding the phone number or email address. The impersonation access acquired from the group admin to read through the existing conversation by the group members. The present invention retrieves the top words from the existing group conversations among the group members and retrieves the trending news stories for the individual words to format them and presented it to the group. The group members' interactions on the presented trending news stories are being monitored and updated it to the respective social media accordingly.

15 Claims, 4 Drawing Sheets

METHOD AND SYSTEM TO PROVIDE THE TRENDING NEWS STORIES TO THE PLURALITY OF GROUPS BASED ON THE PLURALITY OF GROUP MEMBERS EXISTING CONVERSATIONS

CROSS-REFERENCE TO RELATED APPLICATIONS

This application claims the benefit of U.S. Provisional Application No. 62/377,189, filed on Aug. 19, 2016, and incorporated by reference herein in its entirety.

BACKGROUND OF THE INVENTION

1. Field of the Invention

The present invention relates generally to the providing contents to the members in the group, more specially, providing trending contents based on group members interest.

2. Description of Related Art

A group is a feature in many online messaging services which great way to stay in touch with their family, friends and colleagues and allows them to share, create, post, comment to and read from their own interest- and niche-specific forums, often within the realm of virtual communities. Groups, which may allow for open or closed access, invitation and/or joining by other users outside the group, are formed to provide mini-networks within the larger, more diverse social network service. Much like electronic mailing lists, they are also owned and maintained by owners, moderators, or managers, which possess the capability of editing posts to discussion threads and regulating member behavior within the group.

If there is a group of people around then there is a need for providing interesting topic to be discussed among the group members. Each and individual group members would like to discuss about some topic which is more related to their interests. However, each group member might be different in thinking or interest about topics to discuss among the group members. In some scenarios, group members might not aware of the trending topics that are related to the each and individual members in the group. There may be inactivity between groups members on the group because of there are no interesting topics that could be interesting to the group members to discuss about. Hence, there is a need for method and system to provide the interesting trending contents that related to the interest of each and individual members in the group.

SUMMARY

The present disclosure is directed to systems, methods, and computer program products to retrieve the group members' interests by examining their existing conversation and determine the best bets from their existing conversation to retrieve the trending topics related to that from the internet. In one embodiment, group administrator or moderator subscribes his group to the present invention by adding present invention 10-digit phone number to establish the interface to the present invention server. The present invention sends the requests to the group administrator to provide the impersonation permission to access the existing conversation between group members. Once group administrator accepts the present invention request, the present invention communicates to the messaging server with group administrator privileges to retrieves the existing the conversation between the group members.

In another embodiment, group administrator subscribes his group to the present invention by adding present invention's email address to establish the interface between the present invention server and group messaging server. The present invention requests the group administrator permission to use his privileges as the impersonation to contact their corresponding messaging server to retrieve the existing group members' conversation. Once group administrator accepts the request, the present invention contacts the message server to retrieve the group members existing conversation by using the group administrator's credentials.

In some embodiment, the present invention may retrieve the best bets from the retrieved existing group members' conversation. The trending information for the best bets may retrieve from the internet to build the message that may present to the group members.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following is a detailed description of implementations consistent with the principles of the invention along with accompanying drawings indicated above. The same reference numbers in different drawings may identify the same or similar elements. In addition, the following detailed description does not limit the invention.

Implementation consistent with the principles of the invention is directed to providing the contents to the group members based on the retrieved web trend for the group members existing conversations.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
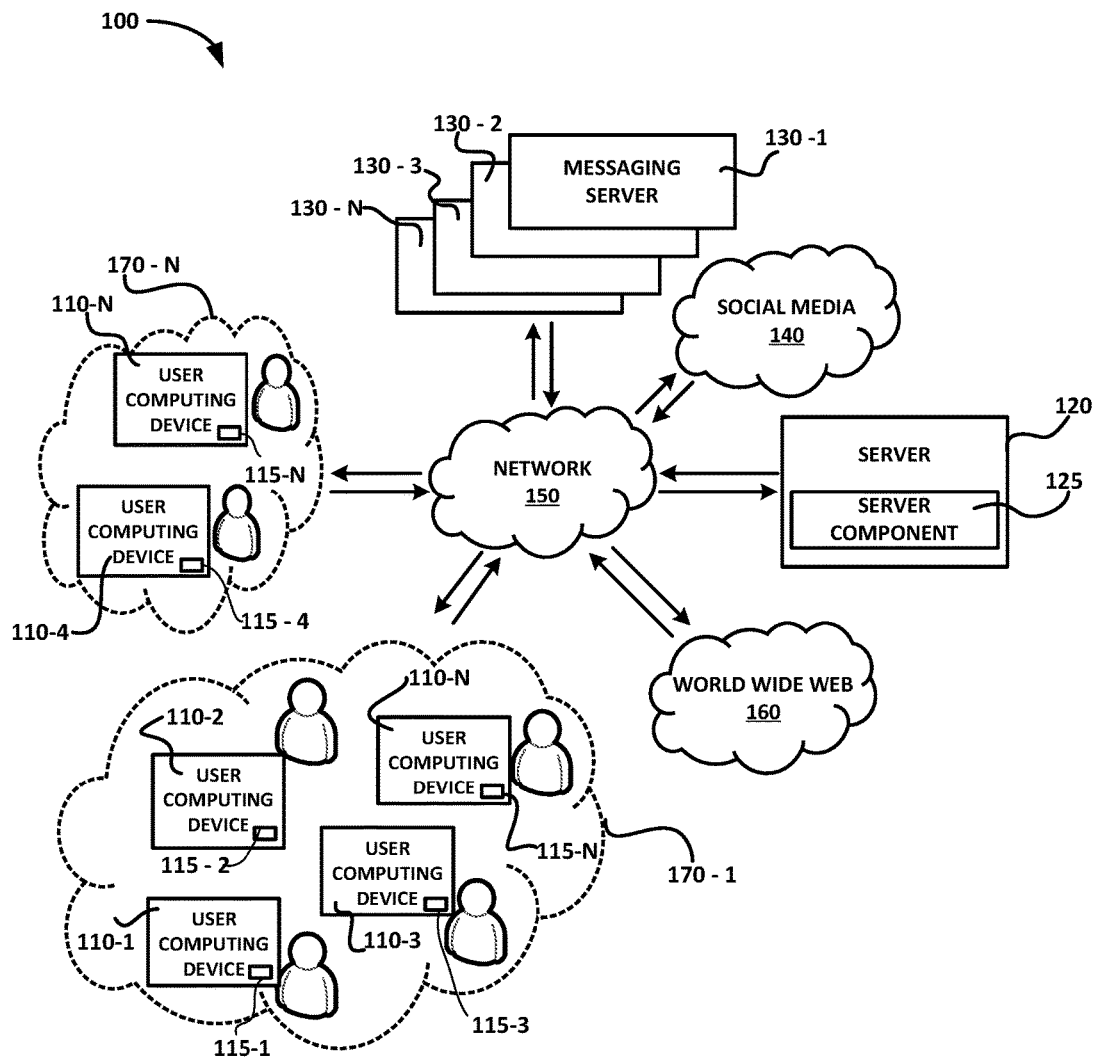
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 150 may include multiple clients 110 connected to server 120, messaging servers 130-1 . . . , 130-N via a network 150. N Clients 110, a server 120, N messaging servers 130 have been illustrated as connected to network 150 for simplicity. In practice, there may be more or fewer clients and servers. Also, in some instances, a client may perform a function of a server and a server may perform a function of a client.

Clients 110 may include client entities. An entity may be defined as a mobile device, such as a personal digital assistant (PDA), a tablet, an iPad, an iPhone, an Android mobile device, Blackberry, or another type of computation or communication device, a thread or process running on one of these devices, and/or an object executable by one of these devices. Servers 120, 130 may include server entities that provide the trending news stories to the plurality of groups based on the plurality of group members' existing conversations in a manner consistent with the principles of the invention. In an implementation consistent with the principles of the invention, client device 110 may include a computer implemented program (hereafter called "Client Component" 115) to provide a cross-platform, encrypted instant messaging client for user computing device 110. It uses the network 150 to send text messages, documents, images, video, user location and audio messages to other users using standard cellular mobile numbers/email addresses.

In an implementation consistent with the principles of the invention, server 120 may include a computer implemented program (hereafter called "Server Component") 125 to retrieve the group members conversation/discussion by impersonating group administrator credentials from the messaging servers 130-1 . . . 130-N and retrieve the number of word occurrences from the group members conversation/discussions and retrieve trend message from the internet for the generated word occurrences to build message to present to the groups 170. Groups 170-1 . . . 170-N illustrated in dotted lines that comprises one or more user computing device and client component connected to the messaging server 130 via network 150. Groups 170 can be created by individual user computing device 110. Groups 170 allow members to post content such as links, media, questions, events, editable documents, and comments on these items. Groups 170 are used for collaboration and allow discussions, events, and numerous other activities. They are a way of enabling a number of people to come together online to share information and discuss specific subjects.

Social Media 140 is an online platform that is used by people to build social networks or social relations with other people who share user generated content such as any form of content such as blogs, wikis, discussion forums, posts, chats, tweets, podcasts, digital images, video, audio files, advertisements and other forms of media that was created by users of an online system or service, often made available via social media websites. Social Media 140 may include social media entities such as Facebook, Flickr, Google, Instagram, Irc Galleria, Linkedin, Pinterest, and Twitter.

Network 150 may include a local area network (LAN), a wide area network (WAN), a telephone network, such as the Public Switched Telephone Network (PSTN), an intranet, the Internet, a memory device, or a combination of networks. Clients 110, servers 120, 130, 140, and 160 may connect to network 150 via wired, wireless, and/or optical connections.

Figure 2:
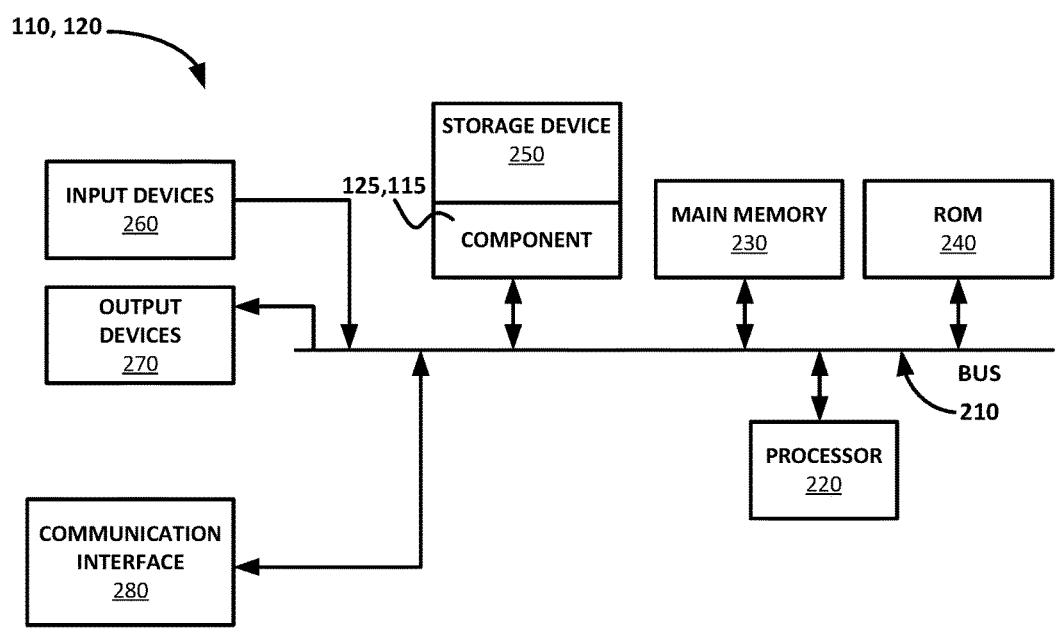
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As it will be described in detail below, the client/server entity, consistent with the principles of the invention, perform certain searching, generating user notification with their activities, updating the user activities to their subscribed social media websites related operations. The client/server entity may perform these operations in responses to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing Sequence

Figure 3:
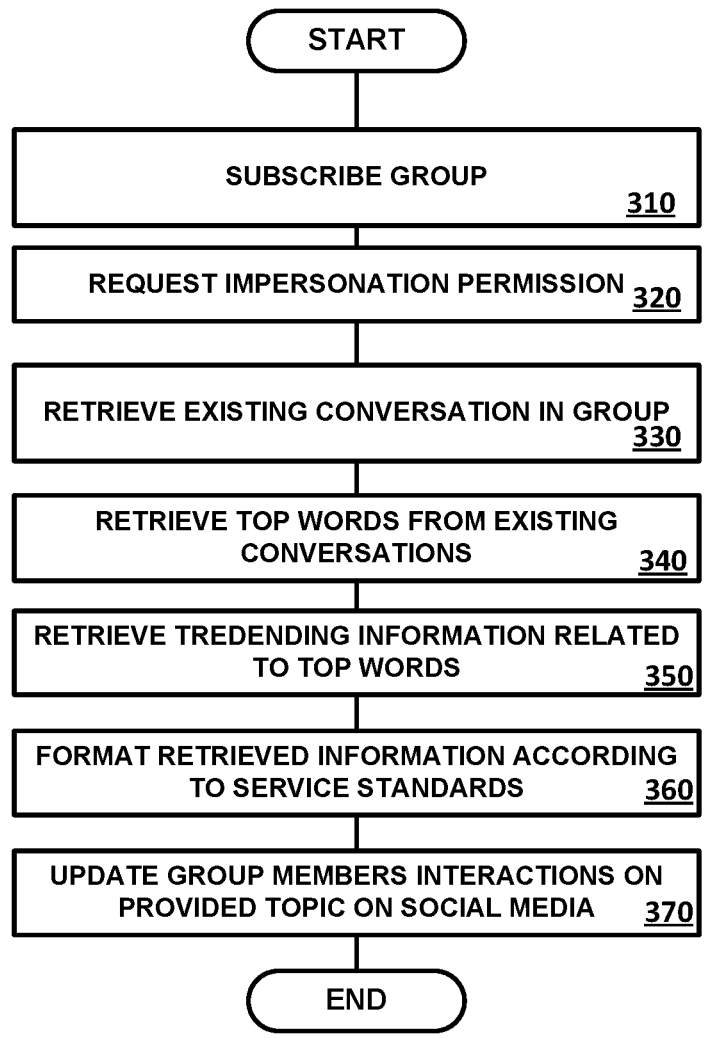
FIG. 3 is a flowchart of operational sequences of the implementation of present invention of FIG. 1 according to an implementation consistent with the principles of the invention.

FIG. 3 is a flowchart of operational sequences of the implementation of present invention of FIG. 1 according to an implementation consistent with the principles of the invention. In step 310, Group administrator or moderator subscribes the group with server component 125 by adding service identity. In one embodiment, group administrator or moderator may add the phone number to their IM messaging group to subscribe the group with present invention. Example, a group administrator of particular whatsapp group may add the present invention phone number (e.g., 1-800-TRENDFX (873-6339)) to his whatsapp group. In another embodiment, a group administrator or moderator of particular online discussion group may add the present invention email address to subscribe their group with present invention. Example, a group administrator of a particular google or yahoo group may add the present invention email address (i.e., miner@trendfx.me) to their group to subscribe their group with present invention.

In step 320, the server component 125 of the present invention sends a request to the group administrator/moderator to acquire the permission/privileges to contact messaging server on behalf of group administrator privileges to access the conversation of group. In step 330, once request may accept by the group administrator, the server component 125 may contact the corresponding messaging provider with group administrator impersonation to access the group messages. Impersonation means letting the present invention account act on behalf of the group member to retrieve the existing conversations/discussion among the group members.

In step 340, the present invention once downloaded/retrieved the existing conversations/discussion among group members from their corresponding messaging provider, the server component 125 analyzes the best bets words from the retrieved conversations/discussion. Best bet words may determine by the number of occurrences for a particular word in the group members' conversations/discussion. Once the number of occurrences of each word determined, then it group by number of word occurrences and then selects the top 10 number of word occurrences to determine the best bet keywords.

In step 350, the trends for the retrieved best bet words related may retrieve from the internet. The trends may build based on the words that how often a particular search-term is entered relative to the total search-volume across various regions of the world, and in various languages and how many people often discussing about a particular word in the social media sites. Example, Imagine one of the top occurrence word from the group members conversation is "cricket" word. The present invention may retrieve the last 7 days of content that related to "cricket" word or related word from the internet. The new contents for the "cricket" word may retrieve based on how often "cricket" or related word is entered to the search volume and the discussions, comments, likes in the social media sites. Similarly, trends/new content for each word from the retrieved top occurrences words may retrieve from the internet by using how often "cricket" or related word is entered to the search volume and the discussions, comments, likes in the social media sites.

In step 360, the retrieved trending information for the group members top word occurrences may format such as encryption, security, includes the like and comment along with message according to the messaging server standards. In step 370, the formatted message may transmit/send to the subscribed group via network. In one embodiment, the group members interaction such as like and/or comment on the presented trending content that are related to the top word occurrences may be recorded and updated to the social media sites when group members subscribed with any social media sites.

Exemplary Block Diagram

Figure 4:
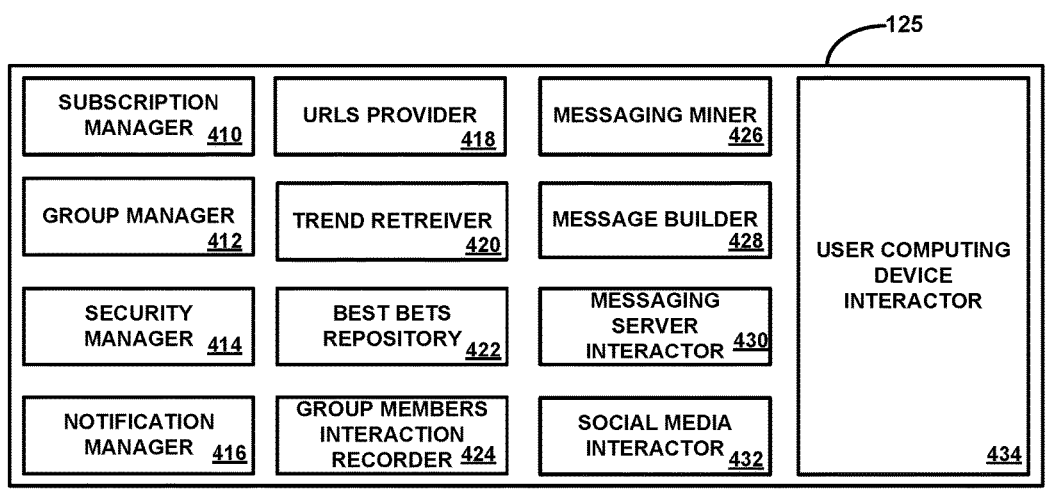
FIG. 4 is a block diagram illustrating an exemplary system according to an implementation consistent with the principles of the invention.

FIG. 4 is a block diagram illustrating an exemplary system according to an implementation consistent with the principles of the invention. The server component 125 may comprises of Subscription manager 410, group manager 412, security manager 414, notification manager 416, URLs provider 418, trend retriever 420, best bets repository 422, group members interaction recorder 424, messaging miner 426, message builder 428, message server interactor 430, social media interactor 432, and user computing device interactor 434.

Subscription Manager 410 is responsible for handling the subscription requests from user computing device 110. In one embodiment, subscription manager 410 provides the email address to the group administrator of a particular online group for them to add the email address to enable the present invention to access the group members' conversations. Similarly, subscription manager 410 provides the phone number to the group administrator of a particular IM group for them to add the phone number to enable the present invention to access the group members' conversations.

Group manager 412 is responsible for holding each group details such as whether it is online community or IM messaging groups, group administrator details, phone number and email address of each group. Each group may assign with unique identifier. Once subscription is established with a particular group, the requested group information may enter into the group manager.

Security manager 414 is responsible for requesting group administrator's permission to contact corresponding messaging server on-behalf of his credentials. Once group administrator grants the permission then security manager builds the impersonation credentials for the group administrator permission and sends the security request to the messaging server.

Notification manager 416 is responsible to send push notification messages directly to user computing devices either via SMS or email. Push notification messages sent to a user computing device endpoint can appear in the user computing device as message alerts, badge updates, or even sound alerts.

URLs Provider 418 that sends lists of URLs to be retrieved to the trend retriever that fetches the trends for the group members' conversation word occurrences ("Best Bets"). The trend retriever 420 is responsible for retrieving the trends for the given best bets words. Trend retriever leverages a list of URLs provided by URLs Provider 418 to retrieve the trends.

Best bet repository 422 is a database for the list of words that are retrieved from the group members' conversation of plurality of groups. Group member interaction recorder 424 is used whenever a new message or any update happens in the group. When group administrator adds the phone number or email address of present invention then group member interaction recorder 424 module of server component 125 initiates the threads for each group and each thread watches if there is any activity in the group. Also, it records the group members interactions on the provided contents that are related to the best bets words that are retrieved from their existing conversations.

Messaging miner 426 is used once trends for the given best bet retrieved. It is the computational process of discovering content related to the given best bets in large data sets. The overall goal of the message mining process is to extract information that related to the given best bet words and transform it into an understandable structure for group member can understand by using message builder 428.

Message server interactor 430 is responsible for establishing the connection between present invention component and plurality of group messaging servers that are related to the plurality of groups to retrieve the group members' conversation. Once group administrator granted the permission, the security manager 414 provides the impersonation authentication credential to the messaging server via message server interactor 430.

Social media interactor 432 is responsible updating the group members' interactions on the provided the content to the group members' subscribed social media sites. Also, this module is used to retrieve those most happening discussions, like, comments that are related to the given best bet while retrieving the trends for the best bets. User computing device interactor 434 is establishing the connection between present invention component and plurality of user computing devices.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "provisioning" or "allocating" or "processing" or "allowing" or "configuring" or "generating" or "obtaining" or "determining" or "retrieving" or "providing" or "establishing" or "converting" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. The present invention also relates to an apparatus for performing the operations herein. This apparatus may be specially constructed for the required purposes, or it may comprise a general-purpose computer selectively activated or reconfigured by a computer program stored in the computer. Such a computer program component may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   at a user computing device, a group administrator subscribing groups of members to a service by adding an identity;
   the service:
   sending a request to the group administrator to acquire permission to retrieve a plurality of existing conversations of the groups of members;
   generating an impersonation identity for the group administrator's added identity;

retrieving the plurality of existing conversations of the groups of members from messaging servers by providing the generated impersonation identity;

generating bestbets keywords from the retrieved plurality of existing conversations;

retrieving trends for the generated bestbets keywords;

building content based on the retrieved trends;

presenting the content to the groups of members;

monitoring interactions of the presented content by the groups of members; and updating the group of members' interactions on a plurality of the groups of members' social media sites.

2. The method of claim 1, wherein subscribing the groups of members to the service by adding the identity includes adding a phone number into an Instant group chat messenger.

3. The method of claim 2, wherein said Instant group chat messenger comprises at least one of: WhatsApp, WeChat, Viber, Skype, MySpace IM, Facebook Messenger, or any form of cross-platform instant group chat messaging service.

4. The method of claim 2, wherein subscribing the groups of members by adding the identity includes adding an email address into online discussion board groups.

5. The method of claim 4, wherein said online discussion board groups comprises at least one of: Google Groups, Yahoo Groups, Facebook Groups, GroupSpaces, Meetup.com, MSN Groups, Windows Live Groups, Or any form of online discussion groups for people sharing common interests.

6. A system, comprising:

a processor; and a memory coupled with the processor, wherein the memory is configured to provide the processor with instructions which when executed cause the processor to:

receive from a group administrator a subscription request for groups of members, the subscription request including an identity;

send a request to the group administrator to acquire permission to retrieve a plurality of existing conversations of the groups of members;

generate an impersonation identity for the group administrator's added identity;

retrieve the plurality of existing conversations of the groups of members from messaging servers by providing the generated impersonation identity;

generate bestbets keywords from the retrieved plurality of existing conversations;

retrieve trends for the generated bestbets keywords;

build content based on the retrieved trends;

present the content to the groups of members;

monitor interactions of the presented content by the groups of members; and update the group of members' interactions on a plurality of the groups of members' social media sites.

7. The system of claim 6, wherein subscribing the groups of members to the service by adding the identity includes adding a phone number into an Instant group chat messenger.

8. The system of claim 7, wherein said Instant group chat messenger comprises at least one of: WhatsApp, WeChat, Viber, Skype, MySpace IM, Facebook Messenger, or any form of cross-platform instant group chat messaging service.

9. The system of claim 7, wherein subscribing the groups of members by adding the identity includes adding an email address into online discussion board groups.

10. The system of claim 9, wherein said online discussion board groups comprises at least one of: Google Groups, Yahoo Groups, Facebook Groups, GroupSpaces, Meetup.com, MSN Groups, Windows Live Groups, Or any form of online discussion groups for people sharing common interests.

11. A computer program product, the computer program product being embodied in a tangible non-transitory computer readable storage medium and comprising computer instructions for:

receiving from a group administrator a subscription request for groups of members, the subscription request including an identity;

sending a request to the group administrator to acquire permission to retrieve a plurality of existing conversations of the groups of members;

generating an impersonation identity for the group administrator's added identity;

retrieving the plurality of existing conversations of the groups of members from messaging servers by providing the generated impersonation identity;

generating bestbets keywords from the retrieved plurality of existing conversations;

retrieving trends for the generated bestbets keywords;

building content based on the retrieved trends;

presenting the content to the groups of members;

monitoring interactions of the presented content by the groups of members; and updating the group of members' interactions on a plurality of the groups of members' social media sites.

12. The computer program product of claim 11, wherein subscribing the groups of members to the service by adding the identity includes adding a phone number into an Instant group chat messenger.

13. The computer program product of claim 12, wherein said Instant group chat messenger comprises at least one of: WhatsApp, WeChat, Viber, Skype, MySpace IM, Facebook Messenger, or any form of cross-platform instant group chat messaging service.

14. The computer program product of claim 12, wherein subscribing the groups of members by adding the identity includes adding an email address into online discussion board groups.

15. The computer program product of claim 14, wherein said online discussion board groups comprises at least one of: Google Groups, Yahoo Groups, Facebook Groups, GroupSpaces, Meetup.com, MSN Groups, Windows Live Groups, Or any form of online discussion groups for people sharing common interests.

* * * * *